(12) United States Patent
Lifson et al.

(10) Patent No.: US 7,836,713 B2
(45) Date of Patent: Nov. 23, 2010

(54) SPEED CONTROL OF MULTIPLE COMPONENTS IN REFRIGERANT SYSTEMS

(75) Inventors: Alexander Lifson, Manlius, NY (US);
Michael F. Taras, Fayetteville, NY (US);
Richard Lord, Burlington, CT (US)

(73) Assignee: Carrier Corporation, Farmington, CT (US)

( * ) Notice: Subject to any disclaimer, the term of this patent is extended or adjusted under 35 U.S.C. 154(b) by 466 days.

(21) Appl. No.: 11/995,117

(22) PCT Filed: Jul. 29, 2005

(86) PCT No.: PCT/US2005/027082

§ 371 (c)(1),
(2), (4) Date: Jan. 9, 2008

(87) PCT Pub. No.: WO2007/018522

PCT Pub. Date: Feb. 15, 2007

(65) Prior Publication Data
US 2008/0276637 A1 Nov. 13, 2008

(51) Int. Cl.
*F25D 17/00* (2006.01)
*F25B 49/00* (2006.01)
(52) U.S. Cl. ............................ 62/179; 62/228.4; 318/67
(58) Field of Classification Search .................. 62/178, 62/179, 180, 181, 183, 228.1, 228.4; 318/67, 318/801, 802, 803
See application file for complete search history.

(56) References Cited

U.S. PATENT DOCUMENTS

| 5,036,676 | A | 8/1991 | Dudley |
| 5,746,062 | A | 5/1998 | Beaverson et al. |
| 6,257,007 | B1 * | 7/2001 | Hartman .................... 62/183 |
| 6,370,888 | B1 | 4/2002 | Grabon |
| 6,579,067 | B1 * | 6/2003 | Holden ....................... 417/2 |
| 6,798,159 | B1 | 9/2004 | Holden |

OTHER PUBLICATIONS

International Preliminary Report on Patentability dated Feb. 7, 2008.
Search Report PCT/US05/27082, Nov. 8, 2005.

* cited by examiner

*Primary Examiner*—Marc E Norman
(74) *Attorney, Agent, or Firm*—Carlson, Gaskey & Olds

(57) ABSTRACT

Variable speed drives are utilized in refrigerant systems to operate motors of the system components at varying speeds, typically for the purposes of capacity adjustment, efficiency enhancement, reliability improvement or power consumption limitation. However, variable speed controls are expensive. The present invention offers flexibility to utilize a variable speed drive to provide variable speed functionality between compressor and fans (or other rotating components having electric motors) within a refrigerant system depending on operational and environmental conditions and external load demands. The switching device switches the variable speed drive between component motors as indicated by a control for the refrigerant system.

26 Claims, 2 Drawing Sheets

SPEED CONTROL OF MULTIPLE COMPONENTS IN REFRIGERANT SYSTEMS

BACKGROUND OF THE INVENTION

This application relates to a refrigerant system wherein a single variable speed control is selectively utilized to provide operation of different components within the refrigerant system at variable speeds.

Refrigerant systems are utilized in applications to change the temperature and humidity or otherwise condition the environment. In a conventional refrigerant system, a compressor delivers a compressed refrigerant to a heat exchanger, known as a condenser, which is typically located outdoors. From the condenser, the refrigerant passes through an expansion device, and then to an indoor heat exchanger known as an evaporator. In the evaporator, moisture may be removed from the air, and the temperature of air blown over the evaporator coil is reduced. From the evaporator, the refrigerant returns to the compressor. Of course, basic refrigerant systems are utilized in combination with many other optional features and in various design configurations.

Variable speed drives are known to vary a compressor operating speed. As the compressor speed is varied, the capacity of the refrigerant system is adjusted as well. Thus, for efficiency, occupant comfort, and flexible system control, it would be desirable to have the ability to operate not only the compressors but also several other components in a refrigerant system, such as fans or pumps, at a variable speed. It is also known to utilize separate and independent variable speed drives (or variable frequency drives) to control the operation of fans blowing air over the heat exchangers or pumps delivering liquid through secondary loops to these heat exchangers. Running a compressor at a variable speed provides an easy way to adjust system capacity. It is often desirable for capacity (sensible and latent) and a head pressure control to adjust the speed of fans or pumps associated with the same refrigerant system. In other words, it is desirable to run both a compressor and a fan at a variable speed.

On the other hand, variable speed drives are expensive. Having an independent variable speed control and drive at each component that would desirably be run at a variable speed would be very expensive. Further, if plural variable speed drives are utilized, the circuitry becomes complex, and undue amounts of space are required. Also, the variable speed controls may only be engaged during limited periods of time during unit operation. In the past, it was proposed to use a single variable speed drive in a system having multiple compressors, and utilize the variable speed drive to be selectively connected to each compressor motor on a needed basis. However, it has not been known to utilize a variable speed drive that can be selectively connected between a compressor motor and a fan motor.

SUMMARY OF THE INVENTION

In a disclosed embodiment of this invention, a variable speed drive is provided in a refrigerant system, and a switching device is utilized such that a single variable speed drive can provide variable frequency power to motors of distinct components in the refrigerant system. As an example, the switching device can selectively provide the variable speed drive to the compressor motor, or to one or the other of the fan motors. In another embodiment, the switching device might be operable to provide a variable frequency to the fan motors blowing air over indoor and outdoor heat exchangers, or the compressor motor. In still another embodiment, the fans may be replaced by pumps, and a single variable speed drive is provided to a compressor motor as well as to at least one of the pump motors. In yet another embodiment, a multi-circuit refrigerant system is provided with a single variable speed drive to control various components in each of the circuits.

A worker of ordinary skill in the art would recognize when variable speed drive control would be desirable for the fan/pump motors, or the compressor motor. The present invention provides the ability to have a single variable speed control that allows the refrigerant system designer to utilize the variable speed drive for the fan motors or the compressor motor based upon changing environmental and operating conditions.

In more complex configurations, the variable speed drive can be connected to more than one compressor motor (including tandem and sequential compressor configurations) and to more than one fan motor or pump motor, while remaining compressors, fans or pumps can be driven without being connected to the variable speed drive. Various control techniques can be utilized to determine which particular compressor/fan should be connected to the variable speed drive and which remaining components can be left to run with conventional power supplies. This decision can be made based upon required capacity, sensible and latent load demands, efficiency considerations, reliability concerns, the maximum load characteristics of the variable speed drives, etc.

Various system transducers can be utilized to determine the most appropriate connections/configuration. Lastly, and as a subset of the proposed idea, two fans, with one associated with the indoor heat exchanger and one associated with the outdoor heat exchanger, can be selectively run from the same variable speed drive, if desired.

These and other features of the present invention can be best understood from the following specification and drawings, the following of which is a brief description.

DETAILED DESCRIPTION OF THE PREFERRED EMBODIMENTS

Figure 1A:
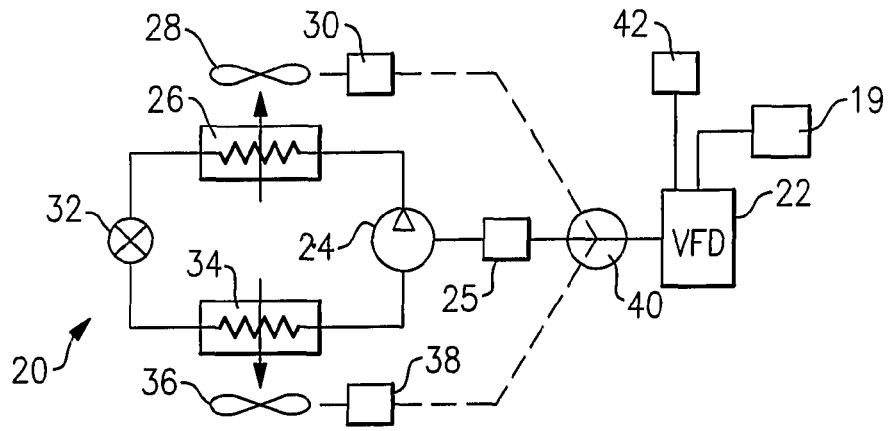
FIG. 1A is a schematic view of a refrigerant system incorporating the present invention.

FIG. 1A shows a refrigerant system 20 incorporating a variable speed drive 22. As is known, a variable speed drive (or variable frequency drive "VFD") provides a variable frequency to electric motors. A controller 19 provides control signals to the variable speed drive based upon system operating and environmental conditions. The controller 19 compares various system operating parameters, and the conditions required to be maintained in the space associated with the refrigerant system, and determines when a variable speed drive function for a motor associated with the refrigerant system 20 might become advantageous. This portion of the present invention is as known in the prior art.

As is known, a refrigerant system 20 typically includes a compressor 24 having a motor 25, and delivering a compressed refrigerant to a heat exchanger such as an outdoor heat exchanger 26. Also, as is known, a fan 28 having an electric motor 30 blows air over the heat exchanger 26. Downstream of the heat exchanger 26 is an expansion device 32, and downstream of the expansion device 32 is yet another heat exchanger 34, that may be located within the environment to be conditioned. A fan 36 has a motor 38 and blows air over the heat exchanger 34 to be delivered to the conditioned space.

As shown in FIG. 1A, a switching device 40, which may be a known electronic component, selectively switches the variable speed drive from the variable speed control 22 to one of the motors 25, 30 or 38. While one of the motors is operated at variable frequencies, the remaining motors receive a constant frequency power from a power supply 42. As the control 19 determines when a variable speed drive function may be desired for one of the fan motors, or for the compressor motor, the switching device 40 provides the variable frequency drive capability to the selected motor. Of course, all of the motors may be driven at a constant frequency power if desired.

However, when the control 19 determines that a variable frequency drive to one of the motors 25, 30 or 38 may be desired, the switching device 40 is moved to provide the variable speed drive to that particular motor. As shown schematically in FIG. 1A by the solid line, the variable frequency is being provided to the compressor motor. This allows the compressor to adjust the refrigerant flow and thus allow the refrigerant system 20 to provide variable sensible and latent capacity demanded by an occupant of the conditioned space maintaining desired temperature and humidity levels, as an example.

Figure 1B:
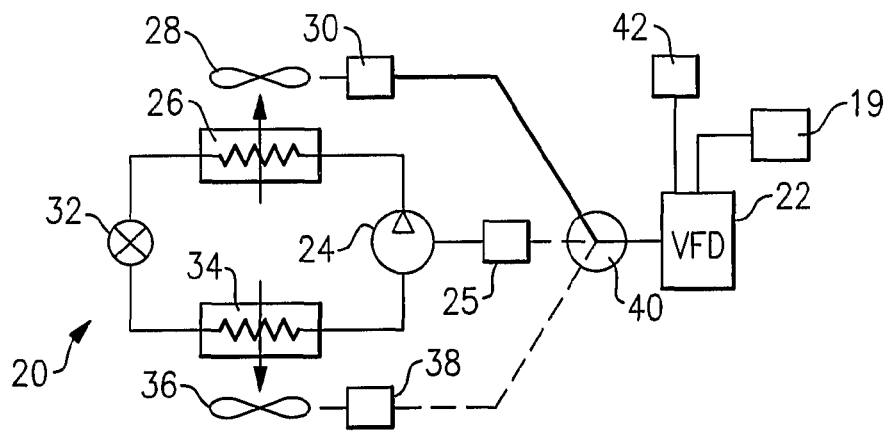
FIG. 1B shows the FIG. 1A system in a distinct position.

FIG. 1B shows an alternative condition wherein the control 19 has determined that a variable frequency would be best provided to the fan motor 30 for blowing the air over the outdoor heat exchanger 26, for instance to maintain a desired head pressure for reliability, safety or power consumption purposes. Although not illustrated, a similar decision can be executed to provide variable speed drive to the motor 38 for the fan 36, for example to prevent coil freeze conditions.

Figure 1C:
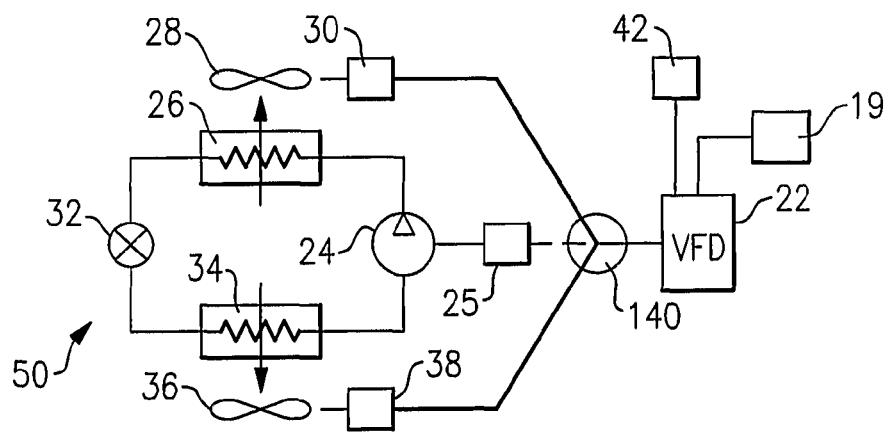
FIG. 1C shows another embodiment of this invention.

FIG. 1C shows yet another embodiment 50 wherein the switching device 140 provides selective variable speed capability to both fan motors 30 and 38. It may well be that when one of the motors 30 or 38 could be preferably provided with a variable frequency, the other fan motor would similarly benefit from the variable frequency. The decision to selectively switch from one fan motor to the other is once again determined by the system control 19 and is usually based on reliability, safety or efficiency considerations.

Figure 2A:
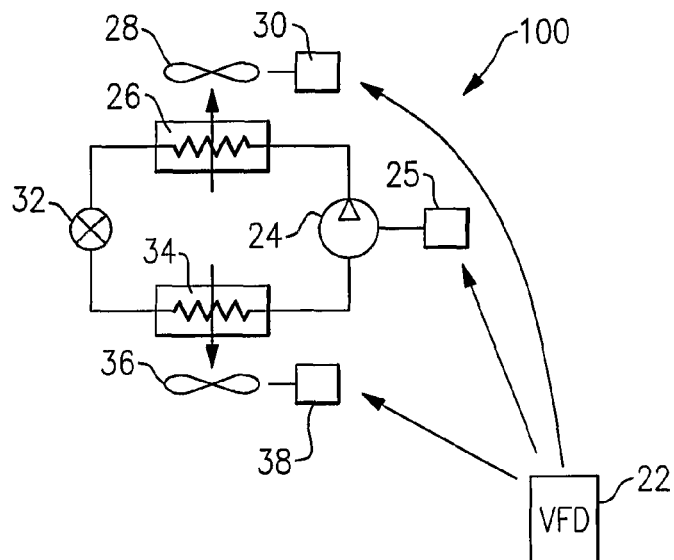
FIG. 2A shows yet another embodiment of this invention.

FIG. 2A shows another embodiment wherein multiple components of plural circuits 100 and 102 within a multi-circuit refrigerant system are provided with the option to be connected to a variable speed drive 22 based upon determination of a control 19. Although the switching device is not illustrated in this figure, a more complex switching device capable of switching between the fan motors 30 and 38 and the compressor motors 25 in the two circuits would be provided. Further, it may well be that an option such as shown in FIG. 1C, wherein the variable frequency can be provided to the compressors or fans (or a combination of those components) in both of the circuits may be utilized. Obviously, a multi-circuit system may include more than two circuits, and such circuits may be of different capacities, to provide a more adequate operation at part-load conditions.

Figure 2B:
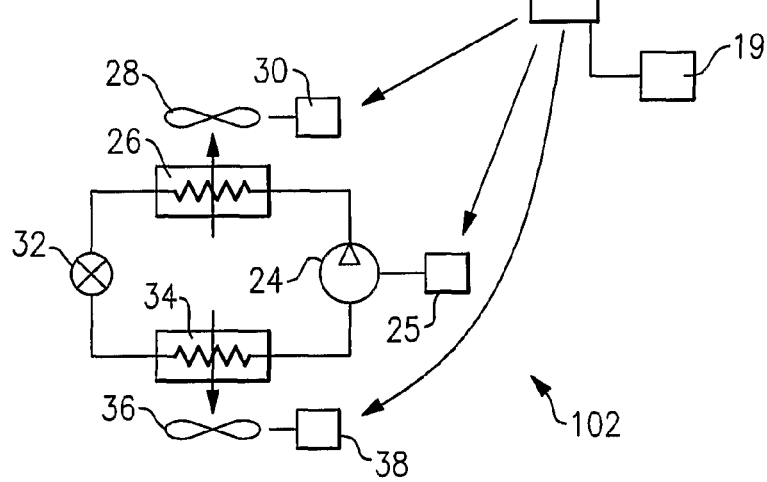
FIG. 2B shows yet another embodiment of this invention.
Figure 2B:
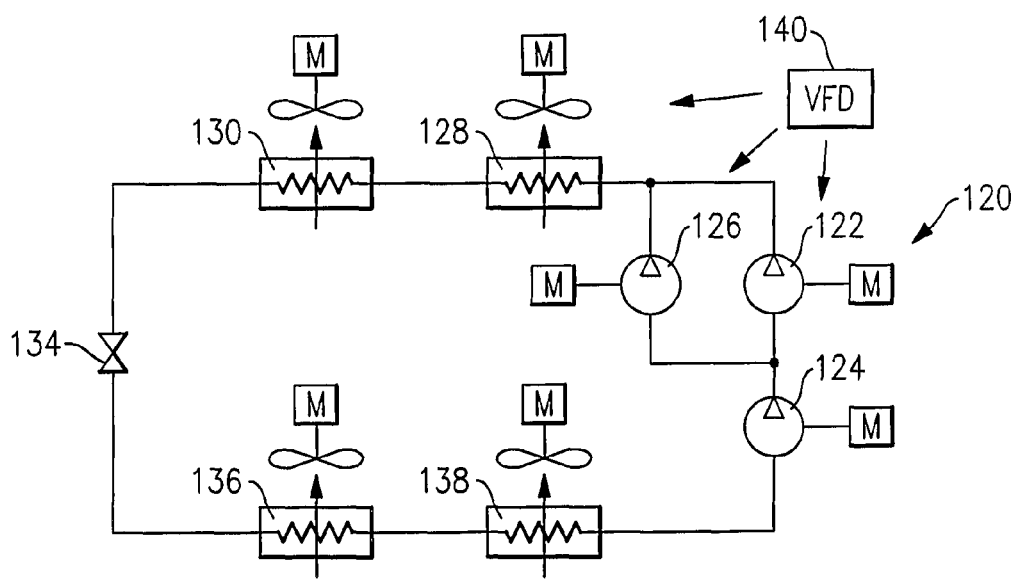

FIG. 2B shows the further power of this invention with the schematic 120. A pair of compressors 122 and 124 can be arranged in series, and, alternatively, the compressors 122 and 126 can be configured as tandem compressors. Further, rather than having a single condenser, there can be a plurality of condensers 128 and 130 each associated with a separate fan. An expansion device 134 is also included. Similarly, there can be plural evaporators 136 and 138. Each of these several components are shown associated with a motor M. The variable speed drive 140 can be connected to drive any combination of these several motors through an appropriate switching device (not shown), of course. Also, the heat exchangers 128, 130, 136, and 138 may be equipped with multiple fans each of which may be driven by a separate motor. Further, multiple compressors may be configured in series and/or in tandem.

While fans are specifically mentioned above, it should be understood that refrigerant systems are known wherein a fluid-moving devices such as pumps move liquid through the heat exchangers. Such refrigerant systems are known as chillers, wherein liquid is moved over at least one of the heat exchangers. This invention would extend to such fluid-moving devices, without concern of whether they are fans or pumps.

The present invention thus provides the ability to have variable speed function provided by a single variable frequency drive to a plurality of motors in a refrigerant system. Thus, this flexibility in control is provided without dramatically increasing the cost of the refrigerant system. It has to be noted that more than one variable frequency drive can be utilized to provide variable speed functionality to multiple components within a refrigerant system.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A refrigerant system comprising:
    at least one compressor having an electric motor, said at least one compressor compressing refrigerant and supplying said refrigerant to at least one downstream first heat exchanger, at least one expansion device downstream of said at least one first heat exchanger, and a second at least one heat exchanger downstream of said expansion device, each of said at least one first and at least one second heat exchangers being provided with at least one fluid-moving device, and each of said at least one fluid-moving devices being provided with an electric motor,
    at least one variable speed drive control, and at least one switching device, said at least one said variable speed drive control providing a variable frequency to at least one of said electric motors for said at least one compressor, and said at least one fluid-moving devices, and at least one said switching device being moved to a position to provide said variable frequency to only one of said at least one of said electric motors; and
    the total number of said electric motors being more than the total number of said variable speed drives controls.

2. The refrigerant system as set forth in claim 1, where the refrigerant system includes one refrigerant circuit.

3. The refrigerant system as set forth in claim 1, where the refrigerant system includes more than one refrigerant circuit.

4. The refrigerant system as set forth in claim 1, where the refrigerant system includes more than one heat exchanger as said first heat exchanger.

5. The refrigerant system as set forth in claim 1, where the refrigerant system includes more than one heat exchanger as said second heat exchanger.

6. The refrigerant system as set forth in claim 1, where the refrigerant system includes more than one fluid-moving device for at least one of said first and second heat exchangers.

7. The refrigerant system as set forth in claim 1, where the refrigerant system includes more than one of said compressor.

8. The refrigerant system as set forth in claim 7, where said compressors are arranged in series.

9. The refrigerant system as set forth in claim 7, where said compressors are arranged in tandem.

10. The refrigerant system as set forth in claim 1, wherein the fluid-moving device is a fan.

11. The refrigerant system as set forth in claim 1, wherein at least one of the any two fluid-moving devices is a pump.

12. The refrigerant system as set forth in claim 1, wherein a control determining when variable frequency is desired for said one of said electric motors, and moving said switching device to provide said variable frequency to said one of said electric motors.

13. The refrigerant system as set forth in claim 1, wherein said switching device is operable to provide said variable frequency to both of said electric motors for said fluid-moving devices associated with both of said first and second heat exchangers.

14. A method of operating a refrigerant system comprising the steps of:
   (1) providing a compressor having an electric motor, a downstream first heat exchanger, an expansion device downstream of said first heat exchanger, and a second heat exchanger downstream of said expansion device, each of said first and second heat exchangers being provided with a fluid-moving device, and each of said fluid-moving devices being provided with an electric motor, and providing a variable speed drive control, and a switching device, said variable speed drive control providing a variable frequency to one of said electric motors for said compressor and said first and second heat exchangers fluid-moving devices; and
   (2) moving said switching device to a position to provide said variable frequency to only one of said electric motors.

15. The method as set forth in claim 14, where the refrigerant system includes one refrigerant circuit.

16. The method as set forth in claim 14, where the refrigerant system includes more than one refrigerant circuit.

17. The method as set forth in claim 14, where the refrigerant system includes more than one heat exchanger as said first heat exchanger.

18. The method as set forth in claim 14, where the refrigerant system includes more than one heat exchanger as said second heat exchanger.

19. The method as set forth in claim 14, where the refrigerant system consists more than one fluid-moving device for at least one of said first and second heat exchangers.

20. The method as set forth in claim 14, where the refrigerant system includes more than one said compressor.

21. The refrigerant system as set forth in claim 20, where said compressors are arranged in series.

22. The refrigerant system as set forth in claim 20, where said compressors are arranged in tandem.

23. The method as set forth in claim 14, wherein the fluid-moving device is a fan.

24. The method as set forth in claim 14, wherein at least one of the any two fluid-moving devices is a pump.

25. The method as set forth in claim 14, wherein a control determining when variable frequency is desired for said one of said electric motors, and moving said switching device to provide said variable frequency to said one of said electric motors.

26. The method as set forth in claim 14, wherein said switching device is operable to provide said variable frequency to both of said electric motors for said fluid-moving devices associated with both of said first and second heat exchangers simultaneously.

* * * * *